April 8, 1952     H. E. HALE     2,592,417
GYROSTABILIZING SYSTEM
Filed Oct. 8, 1945     3 Sheets-Sheet 1

INVENTOR.
HENRY E. HALE
BY
Mueller, Dodds & Mason
ATTORNEYS

April 8, 1952 H. E. HALE 2,592,417
GYROSTABILIZING SYSTEM
Filed Oct. 8, 1945 3 Sheets-Sheet 2
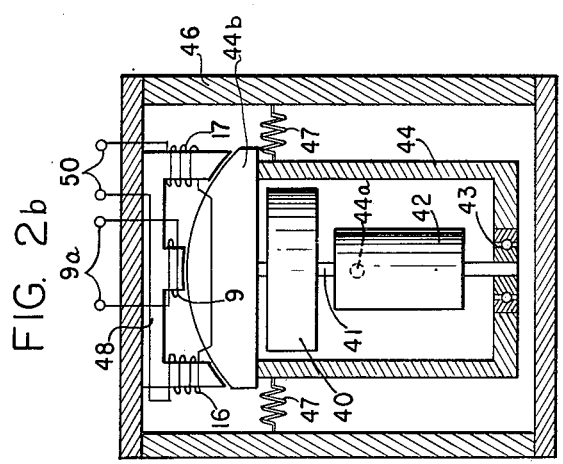
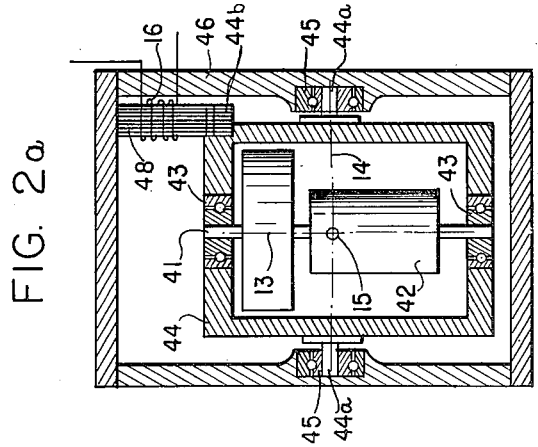
INVENTOR.
HENRY E. HALE
BY
Mueller, Dodds & Mason
ATTORNEYS

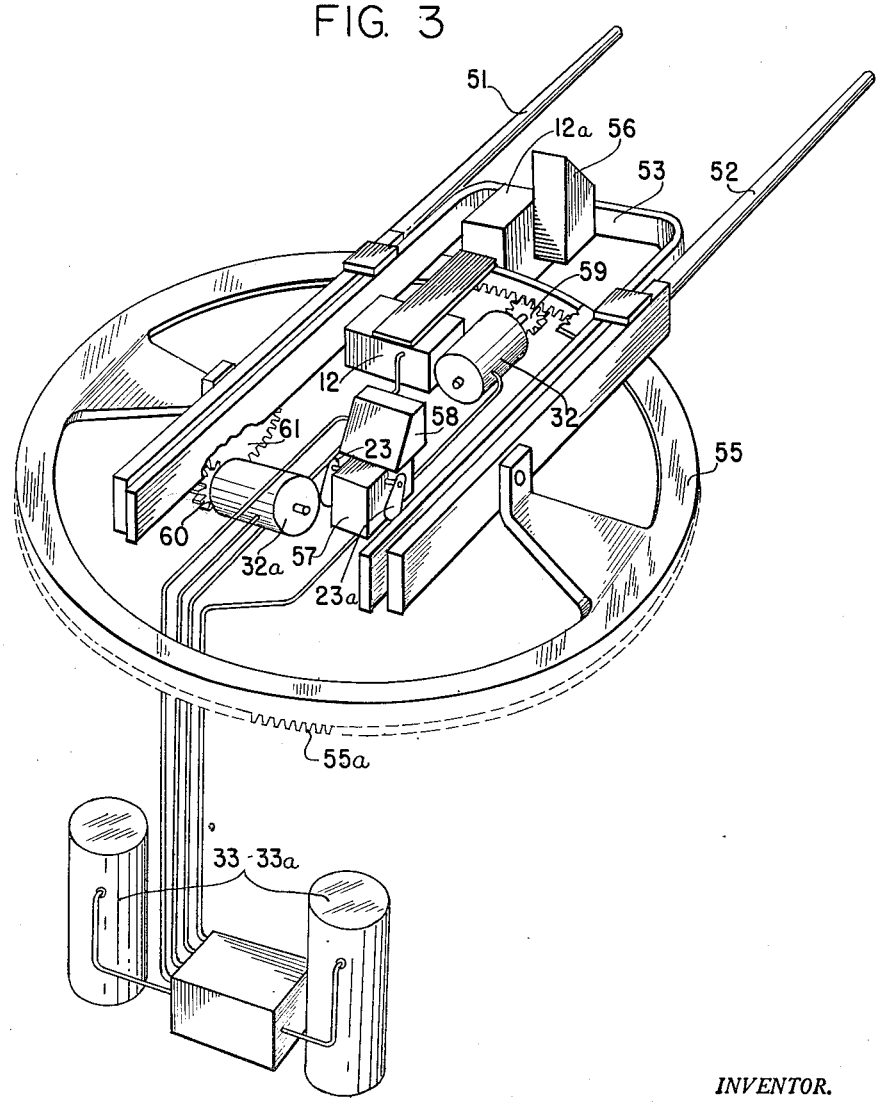

Patented Apr. 8, 1952

2,592,417

UNITED STATES PATENT OFFICE 2,592,417

GYROSTABILIZING SYSTEM

Henry E. Hale, Freeport, N. Y., assignor to Fairchild Camera and Instrument Corporation, a corporation of Delaware Application October 8, 1945, Serial No. 621,066

5 Claims. (Cl. 318—306)

1

This invention relates to gyro-stabilizing systems and more particularly to such systems for stabilizing either the position or the angular velocity of an object in space, or both. While the invention is of general application, it is particularly adapted to the stabilization of a bomber-turret platform on which is mounted one or more guns and a gunsight and will be described in such an application.

Heretofore there have been proposed a number of gyro-stabilizing systems for various purposes. In general, such systems have included a vertical gyroscope and one or more directional gyroscopes. However, such systems have generally been of the off-on type, the control correction being effected at a constant rate so long as any pivotal movement about the stabilization axis continued. Some such systems of the prior art have included a control means to compensate for the actual displacement of the stabilized platform during the time required to reduce the angular velocity substantially to zero. Systems of the type described have been termed "position-stabilized" systems.

In certain applications the stabilization systems of the type described have been too sluggish and inaccurate to be entirely acceptable. Furthermore, it is sometimes desirable to be able to stabilize an object at a predetermined angular velocity about its axis of stabilization. A system including such a feature might be termed a "velocity-stabilized" type of system. For example, such a system is useful in the stabilization of a platform on which are mounted one or more guns and a gunsight provided with a computer and servo-motors for introducing a deviation between the line-of-sight and the line-of-fire of the guns to compensate for the ballistic deflection of the bullets and for the relative motion between the gun and the target. If a position-stabilized type of system were used in such an application, it would be necessary for the gunner continuously to adjust the controls to keep the sight on the target, due to the relative motion between the gun and the target. On the other hand, such a relative motion usually involves an approximately constant relative angular velocity between the gun and the target and the use of a velocity-stabilized system permits the sight to be kept on the target by an initial setting of the angular velocity and subsequent minor adjustments to take into account departures of the relative angular velocity of the sight and target from a constant value. However such adjustments are

2 minor or second-order adjustments which may be made relatively easily by the gunner.

It is an object of the invention, therefore, to provide a new and improved gyro-stabilizing system which is effective to overcome one or more of the above-mentioned disadvantages and limitations of the gyro-stabilizing systems of the prior art.

It is another object of the invention to provide a new and improved gyro-stabilizing system which is effective to stabilize either the position or the angular velocity, or both, of a platform relative to its axes of stabilization.

It is another object of the invention to provide a new and improved gyro-stabilizing system which is effective to stabilize a turret-gun platform of an aircraft about both the azimuth and elevation axes and to stabilize both its position and its angular velocity about both axes.

It is another object of the invention to provide a new and improved rate-gyro for measuring the angular velocity of an object about a given axis which is of general application but is particularly suitable for use in the gyro-stabilizing system of the invention.

In accordance with the invention, a gyro-stabilizing system for stabilizing an object pivotally movable about a given axis comprises a rate-gyro adapted to be supported from the object with its pivotal axis and its spin axis lying in a plane at an angle to the given axis. The system also includes means for deriving two effects varying in opposite senses with the pivotal movement of the rate-gyro and normally balanced in the absence of such pivotal movement, means responsive to the difference of such effects for producing pivotal movement of the object about the given axis in a sense to reduce the pivotal movement of the rate-gyro, and manually operable means for varying in opposite senses the portions of said effects applied to the responsive means to establish a predetermined rate of pivotal movement of said object.

Further in accordance with the invention, a system responsive to the angular velocity of a movable object about a given axis comprises a gyroscopic element adapted to be pivotally supported from the object, the pivotal axis and the spin axis of said element lying in a plane at an angle to the given axis, and means for opposing movement of the element about its pivotal axis with a restraining force. The system also includes means for deriving an electrical signal varying with the movement of the element about its pivotal axis against such force, means adapted to respond to a predetermined function of such electrical signal, and an adjustable impedance means energized by such signal and having an adjustment-impedance characteristic representative of such predetermined function to derive a control signal for the responsive means.

Further in accordance with the invention, a system responsive to the angular velocity of a movable object about a given axis comprises a gyroscopic element adapted to be pivotally supported from the object, the pivotal axis and the spin axis of the element lying in a plane at an angle to the given axis and means for opposing movement of the element about its pivotal axis with a restraining force. The system further includes means for deriving an effect varying with the movement of the element about the pivotal axis against such force, means adapted to respond to a predetermined function of such effect, and means for modifying such effect in accordance with said predetermined function to derive a control effect for the responsive means.

Still further in accordance with the invention, in a gyroscope system including a support and a gyro pivotally supported therefrom about a given axis with its spin axis lying in a plane at an angle to said pivotal axis, a control system comprises means for deriving an effect varying with relative pivotal movement between the gyro and the support and integrating means responsive to such effect for producing relative pivotal movement between the support and the gyro about the given axis of an amount determined by the time-integral of such effect and in a direction to reduce the initial pivotal movement.

For a better understanding of the invention, together with other and further objects thereof, reference is had to the following description taken in connection with the accompanying drawings, while its scope will be pointed out in the appended claims.

Referring now to the drawings:

Figs. 2a and 2b are longitudinal sectional views in planes normal to each other of a rate-gyro embodying a feature of the invention; while Fig. 3 is a perspective view showing the relative mounting of the components of the gyro-stabilizing system of Fig. 1 as applied to the stabilization of a turret-gun platform of an aircraft.

Figure 1:
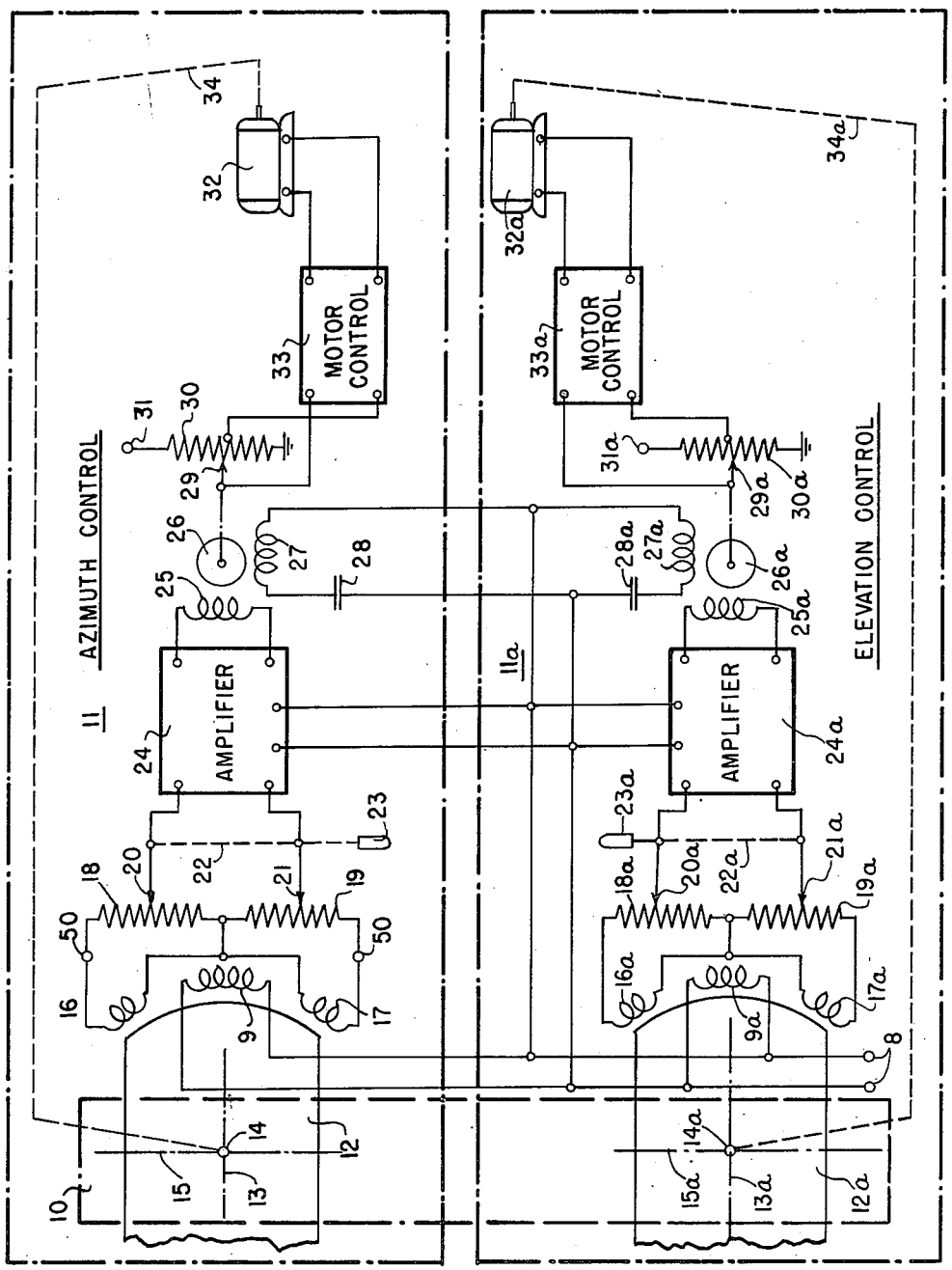
Fig. 1 is a circuit diagram, partially schematic, of a gyro-stabilizing system embodying the invention.

Referring now to Fig. 1 of the drawings, there is represented schematically a gyro-stabilizing system for stabilizing an object pivotally movable about two given axes, for example for stabilizing a gun platform 10 about its azimuth and elevation axes. This system comprises an azimuth control system 11 and an elevation control system 11a. These two control systems are identical except for the fact that their respective gyroscopic elements are pivoted about axes in planes normal to each other. Therefore, the several components of the elevation control system are identified by the same reference numerals as the azimuth system but with a subscript a, and a detailed description of but one of the control systems, for example the azimuth control system 11, will suffice.

The azimuth control system 11 includes a rate-gyro 12 described in more detail hereinafter and adapted to be supported from the object or platform 10 to be stabilized with its pivotal axis and its spin axis lying in a plane at an angle to its respective given axis of stabilization. Specifically referring to Fig. 1, the spin axis 13 and the pivotal axis 14 lie in a plane normal to the plane of the drawing, while the axis of stabilization 15 lies in the plane of the paper but normal to such plane. The rate-gyro 12 includes means for deriving an effect varying in sense and magnitude with the pivotal movement of the rate-gyro about its pivotal axis 13. This means may comprise a pair of pick-up windings 16 and 17 having a pair of voltage dividers 18 and 19 individually connected thereacross and provided with adjustable contacts 20 and 21, respectively, which are mechanically interconnected by way of a mechanism 22 for manual operation by a control knob 23. Coupled to the windings 16 and 17 is a primary or exciting winding 9 connected to suitable alternating-current supply terminals 8 of any suitable frequency.

The control system 11 also includes integrating means responsive to the effect developed by the rate-gyro 12 for producing pivotal movement of the gun platform 10 about the respective axis of stabilization 15 of the rate-gyro 12 at a rate dependent upon the magnitude of such effect, of an amount determined by the integral of said effect, and in a direction or sense to reduce the pivotal movement of the rate-gyro and of the gun platform on which it is mounted substantially at zero, that is to stabilize the position of the gun platform 10 about the axis 15. This integrating means includes electrical signal-responsive means such as an amplifier 24 having an input circuit connected to the adjustable contacts 20 and 21 and an output circuit connected to a first phase winding 25 of a two-phase reversible motor 26 having a second phase winding 27 connected to the supply circuit terminals 8 through a phase-shifting condenser 28. The integrating means is connected to produce a displacement proportional to the time-integral of the effect or signal between the contacts 20 and 21. This displacement may be either an electrical displacement, such as a charge on a condenser, or a mechanical displacement. In the system illustrated, the displacement is mechanical and is obtained by connecting the motor 26 to drive an adjustable contact 29 of a voltage divider 30 connected to a suitable direct or alternating-current supply circuit 31.

The azimuth control system 11 also includes means responsive to the displacement of the adjustable contact 29 for reducing the pivotal movement of the rate-gyro 12 and its associated gun platform 10. This drive means may be of the electrical, mechanical, hydraulic or pneumatic type but is illustrated, by way of example, as being of the electrical type and comprising a reversible motor 32 connected through any conventional motor control unit 33 to operate at a speed determined by the potential of the adjustable contact 29. The motor 32 has its shaft connected by the mechanism indicated schematically at 34 to rotate the rate-gyro 12 and its associated gun platform 10 about the axis 15 in a direction opposite to its initial pivotal movement about its axis; that is to reduce substantially to zero the pivotal displacement of the rate-gyro 12 about the stabilization axis 15.

The azimuth control system 11 also includes means for modifying the response of the signal-responsive means comprising the amplifier 24 and the motor 26 to the effect or signal developed by the rate-gyro 12 to establish a predetermined rate of pivotal movement of the rate-gyro 12 and it associated gun platform 10 about the axis of stabilization 15, that is to stabilize these elements at a given angular velocity about the axis 15. This velocity-stabilizing means comprises the manually operable knob 23 effective to adjust the contacts 20 and 21 on the voltage dividers 18 and 19, respectively, in opposite senses to vary in opposite senses the portions of the signals developed across the voltage dividers 18 and 19 applied to the signal-responsive amplifier 24 and motor 26.

Before taking up the operation of the gyro-stabilizing system of Fig. 1, reference is made to Figs. 2a and 2b which are longitudinal cross-sectional views on planes normal to each other of a rate-gyro for measuring the angular velocity of an object about a given axis and suitable for use as the rate-gyro 12 and 12a of Fig. 1. Elements of the apparatus of Figs. 2a, 2b corresponding to elements of the system of Fig. 1 are identified by the same reference numerals. The rate-gyro of Figs. 2a and 2b comprises a gyroscopic element or flywheel 40 mounted on a common shaft 41 with and driven by a motor 42. The shaft 41, which rotates about the spin axis of the gyroscope, is mounted in anti-friction bearings 43, 43 in a casing 44 of magnetic material. The gyroscopic element 40 is adapted to be supported from the object to be stabilized and to be pivoted about a single axis rather than about two axes normal to each other, as in the conventional gimbal-ring support. To this end, the casing 44 is provided with aligned pivots 44a, 44a mounted in anti-friction bearings 45, 45 in an outer enclosing casing or housing 46 which is adapted to be fixedly supported from the object to be stabilized. As indicated in Fig. 2a, the axis of the shaft 41, or spin axis 13, and the axis 14 of the pivots 44a, 44a lie in the plane of the drawing, while the rate-gyro is adapted to stabilize the object from which it is supported about a given axis 15 at an angle to, preferably normal to, this plane.

The rate-gyro also includes means for restraining movement of the casing 44 and the gyroscopic element 40 about the pivotal axis 14, this means being in the form of opposed tension springs 47, 47 interconnecting the casing 44 and the outer housing 46 and normally adjusted so that the casing 44 is symmetrically disposed in the housing 46. The rate-gyro also includes a magnetic device including a pair of pick-up windings and means for inducing periodic potentials therein. This magnetic device may be in the form of an E-magnet 48 including an exciting winding 9, corresponding to the winding 9 of Fig. 1, on its center core adapted to be energized with alternating-current at its terminals 9a, 9a, which may be connected to the supply terminals 8 of Fig. 1, and a pair of pick-up windings 16 and 17 connected in series opposition and brought out to terminals 50. There are also provided magnetic means movable with the gyroscopic element 40 for determining the relative amplitudes of the potentials induced in the windings 16 and 17. To this end, the magnet 48 is supported from the top wall of the housing 46, as viewed in Fig. 2a, and adjacent to and parallel to one of the side walls so that a laminated magnetic armature 44b disposed on the adjacent wall of the casing 44 of magnetic material comprises a movable armature for the magnet. In order to reduce the minimum reluctance of the magnet 48, and thus increase its sensitivity, the cooperating surfaces of the magnet 48 and the armature 44b may be made cylindrical surfaces having a common axis 14. The output circuit terminals 50 including the windings 16 and 17 connected in series opposition are responsive jointly to, that is to the difference of, the induced potentials in the windings 16 and 17, this difference constituting an effect or an electrical signal representative of the angular velocity of the object being stabilized.

Referring first to the operation of the rate-gyro of Figs. 2a, 2b, it will be apparent to those skilled in the art that, upon pivotal movement of the gyro about the stabilization axis 15, the gyroscopic element 40 will precess about the pivotal axis 14 due to the fact that it is constrained from movement relative to its supporting platform about the stabilization axis 15. This precession of the gyroscope is limited or restrained by the springs 47 and it is elementary that, with such mounting, the pivotal movement of the gyroscopic element about its pivotal axis is proportional to the angular velocity of the gyro and its platform about its axis of stabilization 15. When the gyroscopic element is in its normal position, the potentials induced in the windings 16 and 17 by the primary winding 9 are equal and, since the windings 16 and 17 are connected in series opposition, the net output signal or effect appearing at the terminals 50 is zero. Upon precession of the gyroscope about the pivotal axis 14, the movement of armature 44b is effective to increase the coupling between the winding 9 and one of the pick-up windings 16 and 17 and to decrease the coupling between the primary winding 9 and the other pick-up winding. The difference between the signals developed in the windings 16 and 17, therefore, varies in magnitude and polarity in accordance with the amount and sense of the precession of the gyroscopic element 40; that is, in accordance with the magnitude and sense of the angular velocity of the gyro and its supporting platform about the stabilization axis 15. By a proper design of the magnetic circuit of the E-magnet 48, the output signal developed at the terminals 50 may be made to vary substantially linearly with the angular velocity of the gyro about the axis 15. On the other hand, the displacement-resistance characteristics of the voltage dividers 18, 19 and 30 may be shaped or tapered in accordance with any desired predetermined function to modify the signal output of the rate-gyro 12 in such a way as to cause the stabilization to follow such functional characteristic. It is to be understood that this signal output of the rate-gyro may be utilized simultaneously for other purposes such as indicating and controlling operations or for computing quantities involving the parameter angular velocity of the gyro supporting platform.

Referring now to Fig. 1 of the drawings and assuming that the contacts 20 and 21 are initially adjusted symmetrically on their respective voltage dividers 18 and 19, it will be seen that the rate-gyro 12 is effective to develop two opposed effects or electrical signals of opposite polarities across the voltage dividers 18 and 19 which signals vary in opposite senses with the pivotal movement of the rate-gyro 12 and are normally balanced in the absence of such pivotal movement. Therefore, in the absence of such pivotal movement, no signal is applied to the amplifier 24, only the winding 25 of the motor 26 is energized and the motor 26 remains at rest. Upon pivotal movement of the rate-gyro 12 and its supporting platform about the axis 15, the signals induced in the windings 16 and 17 become unbalanced and the adjustable contacts 20 and 21 select predetermined portions of these unbalanced signals, the difference being applied to the amplifier 24 and thence to the winding 25 of motor 26. The motor 26 thus comprises an integrating means which is operable at a speed proportional to the value of the signal appearing at the contacts 20 and 21 and produces a rotation of its shaft and a displacement of the adjustable contact 29 proportional to the time-integral of the net effect or signal developed by the rate-gyro 12.

A displacement of the adjustable contact 29, as described, is effective to develop thereat an electrical signal varying in magnitude with the time-integral of the signal developed by the rate-gyro and of a polarity dependent upon the polarity of such signal. This potential at the contact 29 is utilized to operate the motor control 33, which may be of any suitable well-known potential-responsive control circuit, to operate the motor 32 at a speed proportional to the potential at the contact 29. The motor 32, through the mechanism 34, thereupon rotates the rate-gyro 12 and its supporting platform 10 about the stabilization axis 15 in a sense and by an amount to reduce substantially to zero its initial pivotal displacement.

Thus it is seen that the stabilization system thus far described is effectively a position-stabilizing system in that it produces a corrective pivotal displacement of the rate-gyro 12 and its supporting platform equal to the time-integral of its angular velocity, which is exactly equal and opposite to its total undesired displacement throughout its period of pivotal movement, due to the "memory" characteristic of the integrating means. This method of operation is to be contrasted to prior art stabilization systems which produce a corrective pivotal movement at a constant rate upon precession of the gyroscope by a predetermined minimum amount representing a minimum angular velocity of the rate-gyro about its pivotal axis. It is apparent that this method of position-stabilization is inherently inaccurate due, among other factors, to the minimum "slip" or regulations necessary to initiate the stabilizing operation.

The gyro-stabilizing system described is also effective to establish a predetermined rate of pivotal movement of the rate-gyro and its supporting platform, that is to stabilize the system at a given constant angular velocity about its axis of stabilization 15. This characteristic is provided by the manually operable knob 23 which, by simultaneously adjusting the contacts 20 and 21 in opposite senses relative to their respective voltage dividers 18 and 19, is effective to unbalance the difference of the signals derived from the voltage dividers 18 and 19 in the absence of initial pivotal movement of the rate-gyro about the stabilization axis 15. In other words, neglecting initial pivotal movement of the rate-gyro 12 about the axis 15, adjustment of the knob 23 is effective to apply to the amplifier 24 and motor 26 a signal of constant amplitude which simulates the signal developed by a predetermined undesired angular velocity of the gyro 12 and its supporting platform about the axis 15. This signal therefore actuates the control system described to produce an equal angular velocity of the gyro 12 and the platform 10 in opposite direction. Assuming, therefore, that there was no undesired initial angular velocity of the elements about the axis 15, adjustment of the knob 23 as described causes the system to establish pivotal movement of the elements about the axis 15 at such predetermined constant angular velocity. This velocity may be maintained at any value within the range of operation of the system, as determined by the range of travel of the adjustable contact 29 over the voltage divider 30. As mentioned above, this characteristic is particularly useful in the stabilization of a gunsight platform, as the relative movement between the sight and the target usually closely approximates a constant angular velocity. By an appropriate adjustment of the knob 23, the gyro-stabilizing system may establish this constant angular velocity between the gunsight and the target so that the gunner need subsequently make adjustment only for slight deviations of the relative angular velocity of the sight and target from constancy.

The operation of the elevation control channel 11a is identical to that of the azimuth control channel described except that the stabilization axis 15a is horizontal rather than vertical. Further it is to be understood that, while the invention is illustrated as embodied in a system for stabilizing a platform about two polar axes, that is the azimuth and zenith axes, it is equally applicable to the stabilization of a platform about three axes such as the axes of a system of Cartesian coordinates.

It will be clear that, in actual operation, the effects due to extraneous and undesired pivotal movements of the platform 10 about the axes of stabilization 15 and 15a will be superimposed upon the effects developed by virtue of the adjustment of the control knobs 23 and 23a to establish predetermined angular velocities of the platform 10 about these axes, control through each of the channels 11 and 11a being responsive to the algebraic sums of the signals developed by the rate-gyros 12 and 12a due to the extraneous and undesired pivotal movement of the platform 10 and those developed by manual adjustments of the knobs 23 and 23a.

Referring now to Fig. 3 of the drawings, there is illustrated schematically in perspective the application of the gyro-stabilizing system of the invention to the stabilization of the platform of two turret guns 51 and 52. These guns are rigidly supported from a yoke 53 which is pivotally supported from two upstanding webs 54 of a circular turret frame 55 which is rotatably mounted in an aircraft fuselage (not shown) in a conventional manner. Mounted on the yoke 53 is an elevation rate-gyro which may be the gyro 12a of Fig. 1. A gun sight 56 is also shown as mounted on the yoke 53. Mounted on the gun turret frame 55 is an azimuth rate-gyro which may be the rate-gyro 12 of Fig. 1. However, if desired, the azimuth gyro 12 may also be mounted on the gun yoke 53 if a suitable correction is introduced into the system to account for the fact that the output signal thereof will then be multiplied by the cosine of the angle of elevation. The manual control knobs 23 and 23a to be operated by the gunner are mounted on a suitable control box 57 which houses the voltage dividers 18 and 19. Also mounted on the turret frame 55 is a junction box 58 through which connections are made from the rate-gyros 12 and 12a and the control box 57 to the motor control units 33, 33a disposed beneath the turret. Suitable connection cables extend from the units 33, 33a to the azimuth control motor 32 and the elevation control motor 32a. The motor 32 is connected through a pinion 59 to drive a circular rack 55a on the turret frame 55. The elevation control motor 32a is connected through a pinion 60 and a sector 61 secured to the gun yoke 53 to elevate the yoke 53 and the guns 51, 52. It is believed that the operation of the stabilized gun turret of Fig. 3 will be clear from the foregoing explanation of the operation of the gyro-stabilizing system.

While there has been described what is at present considered to be the preferred embodiment of the invention, it will be apparent to those skilled in the art that various changes and modifications may be made therein without departing from the spirit or scope of the invention.

What is claimed as new is:

1. A gyro-stabilizing system for stabilizing an object pivotally movable about a given axis comprising, a rate-gyro adapted to be supported from said object with its pivotal axis and its spin axis lying in a plane at an angle to said given axis, means for deriving two opposed effects varying in opposite senses with the pivotal movement of said rate-gyro and normally balanced in the absence of such pivotal movement, means responsive to the difference of said effects for producing pivotal movement of said object about said given axis in a sense to reduce the pivotal movement of said rate-gyro, and manually operable means for varying in opposite senses the portions of said effects applied to said responsive means to establish a predetermined rate of pivotal movement of said object.

2. A gyro-stabilizing system for stabilizing an object pivotally movable about a given axis comprising, a rate-gyro adapted to be supported from said object with its pivotal axis and its spin axis lying in a plane at an angle to said given axis, means for deriving two electrical signals of opposite polarities and varying in opposite senses with the pivotal movement of said rate-gyro, means differentially responsive to said signals for producing pivotal movement of said object about said given axis in a sense to reduce the pivotal movement of said rate-gyro, and means for varying in opposite senses the portions of said signals applied to said responsive means to establish a predetermined rate of pivotal movement of said object.

3. A gyro-stabilizing system for stabilizing an object pivotally movable about a given axis comprising, a rate-gyro adapted to be supported from said object with its pivotal axis and its spin axis lying in a plane at an angle to said given axis, means including two voltage dividers each having an adjustable contact for deriving two electrical signals of opposite polarities and varying in opposite senses with the pivotal movement of said rate-gyro, signal-responsive means including connections to said adjustable contacts for producing pivotal movement of said object about said given axis in a sense to reduce the pivotal movement of said rate-gyro, and means for adjusting said contacts in opposite senses to establish a predetermined rate of pivotal movement of said object.

4. A system responsive to the angular velocity of a movable object about a given axis comprising, a gyroscopic element adapted to be pivotally supported from said object, the pivotal axis and the spin axis of said element lying in a plane at an angle to said given axis, means for opposing movement of said element about its pivotal axis with a restraining force, means for deriving an electrical signal varying with the movement of said element about said pivotal axis against such force, means adapted to respond to a predetermined function of said electrical signal, and an adjustable impedance means energized by said signal and having an adjustment-impedance characteristic representative of said predetermined function to derive a control signal for said responsive means.

5. A system responsive to the angular velocity of a movable object about a given axis comprising, a gyroscopic element adapted to be pivotally supported from said object, the pivotal axis and the spin axis of said element lying in a plane at an angle to said given axis, means for opposing movement of said element about its pivotal axis with a restraining force, means for deriving an electrical signal varying with the movement of said element about said pivotal axis against such force, means adapted to respond to a predetermined function of said electrical signal, and a voltage divider connected to be energized by said signal and having a manually adjustable contact, said voltage divider having a displacement-resistance characteristic representative of said predetermined function to derive a control signal for said responsive means.

HENRY E. HALE.

REFERENCES CITED

The following references are of record in the file of this patent:

UNITED STATES PATENTS

| Number | Name | Date |
|---|---|---|
| 1,959,804 | Wittkuhns et al. | May 22, 1934 |
| 1,966,170 | Greene | July 10, 1934 |
| 2,014,825 | Watson | Sept. 17, 1935 |
| 2,456,020 | Poitras et al. | Dec. 14, 1948 |

FOREIGN PATENTS

| Number | Country | Date |
|---|---|---|
| 187,104 | Germany | July 20, 1907 |
| 616,248 | Germany | June 27, 1935 |